Aug. 7, 1945.    T. G. MYERS    2,381,615
SUBMERSIBLE STRUCTURE
Original Filed Nov. 8, 1937    3 Sheets-Sheet 3
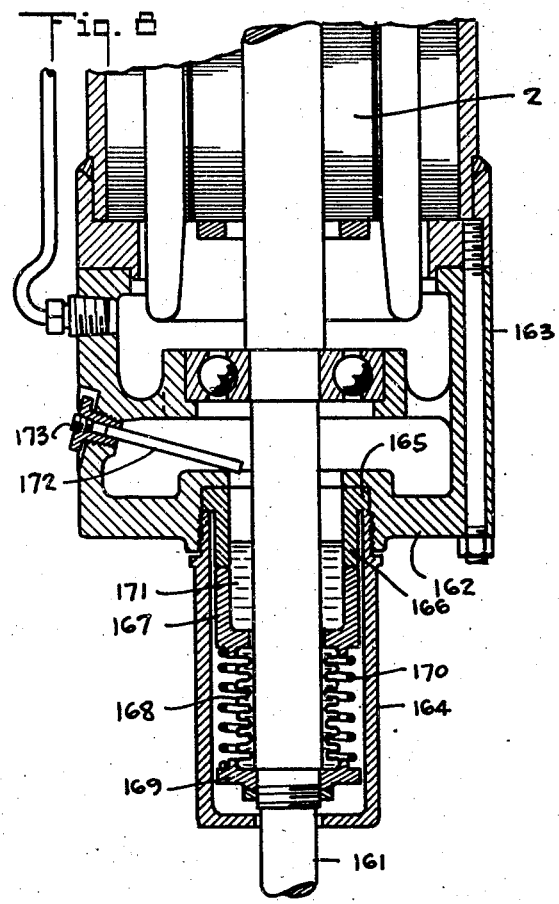
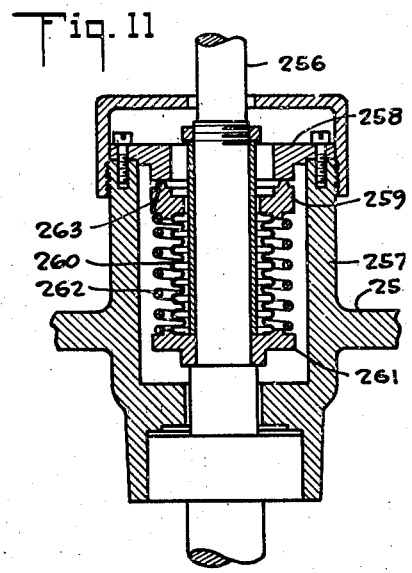
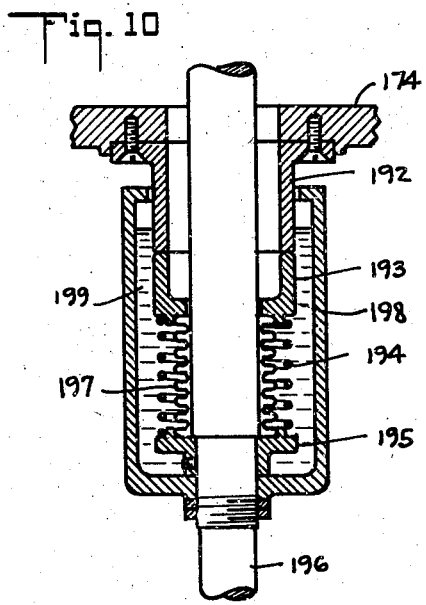
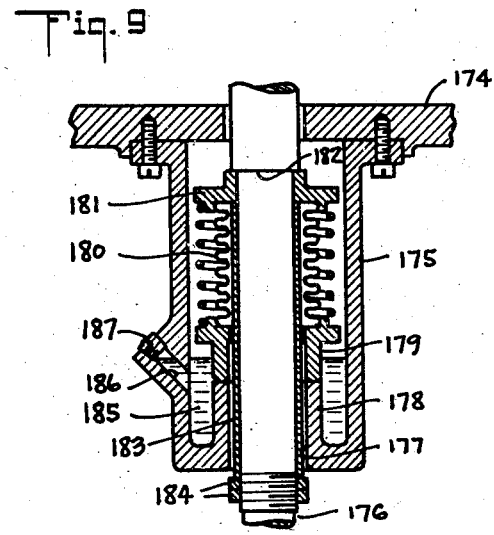
INVENTOR
Thomas G. Myers
BY John Flann
ATTORNEY Patented Aug. 7, 1945

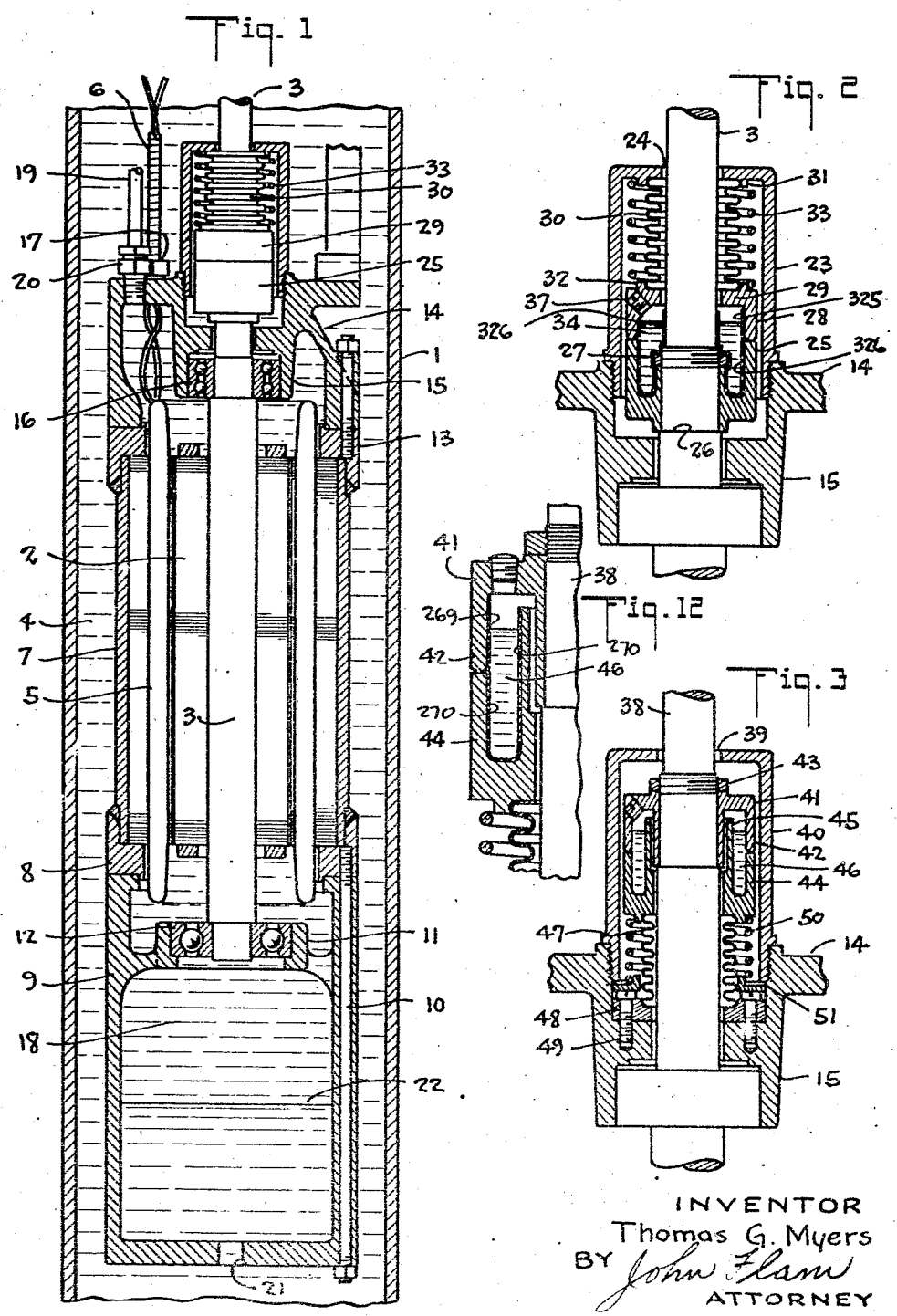

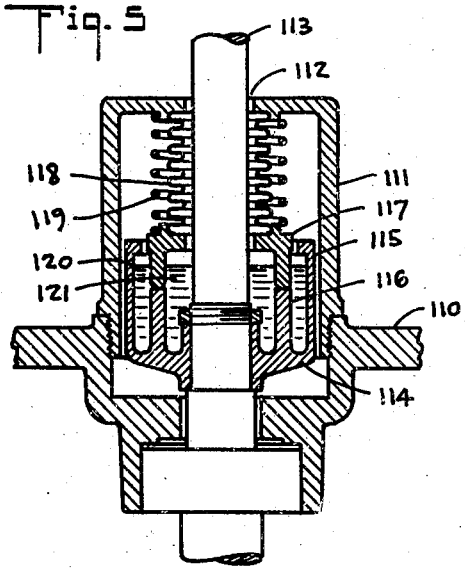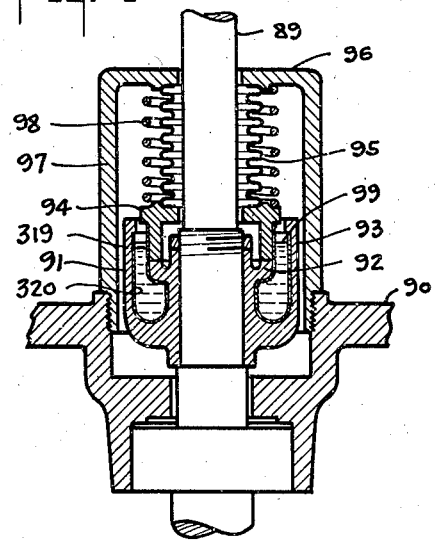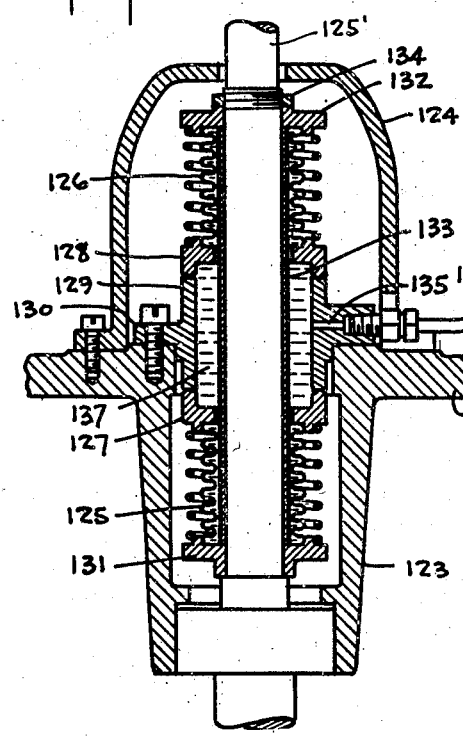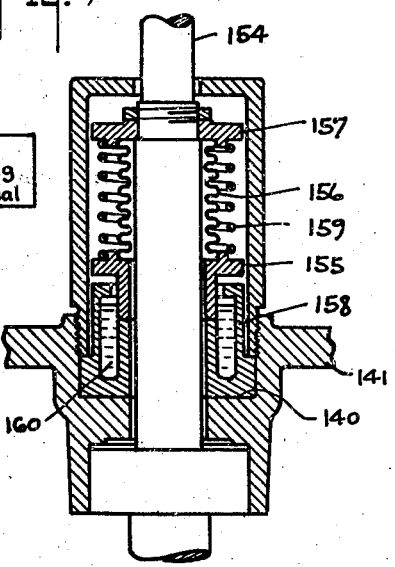

2,381,615

UNITED STATES PATENT OFFICE 2,381,615

SUBMERSIBLE STRUCTURE

Thomas G. Myers, Los Angeles, Calif., assignor to
U. S. Electrical Motors, Inc., Los Angeles, Calif.,
a corporation of California Original application November 8, 1937, Serial No. 173,434, now Patent No. 2,318,181, dated May 4, 1943. Divided and this application July 31, 1942, Serial No. 453,127

9 Claims. (Cl. 286—11)

This invention relates to submersible structures, such as submersible electric motors adapted to be lowered in a well for driving a pump directly connected to the motor. This application is a division of an application filed in the name of Thomas G. Myers, on November 8, 1937, Serial No. 173,434, and entitled "Submersible structure," now Patent No. 2,318,181, issued May 4, 1943.

Usually the material pumped from the well is of such character as to be harmful to the motor should it enter into the motor casing. For example, when water is pumped, it should be kept away from the windings and contacting parts, so as not to cause electrical circuits to be improperly established, that would disable the motor. Also, such liquids usually carry grit, sand or other foreign matter that would quickly ruin the bearings inside of the motor. Accordingly it is of considerable importance to segregate the casing interior as completely as possible from the liquid in which it is submerged.

It is one of the objects of this invention to make it possible in a simple and effective manner to ensure against entry of the external liquid to the operating parts of the motor.

It has been proposed in the past to provide rotary seals of various kinds to effect this result, the seals being disposed around the shaft that necessarily must extend out of the motor casing. However, since the motor casing is subjected to varying liquid pressure, dependent upon the depth at which it is submerged, these ordinary seals have been found quite inadequate. It is another object of this invention to provide a double seal effect to ensure to a greater degree against failure of the seal.

It is another object of this invention to utilize the rotating contact surface type of seal to supplement a liquid seal.

It is still another object of this invention to provide a combination liquid seal, such as mercury, and a seal formed by contact between a pair of relatively rotatable members, the mercury overlapping the region of contact.

It is still another object of this invention to improve in general, seals embodying such relatively rotatably members.

This invention possesses many other advantages, and has other objects which may be made more easily apparent from a consideration of several embodiments of the invention. For this purpose there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Figure 1 is a view, mainly in longitudinal section, of a structure embodying the invention, shown as submerged in a well;

Fig. 2 is an enlarged fragmentary sectional view of the structure shown in Fig. 1, and particularly showing the construction of the seal for the submersible structure;

Figs. 3, 4, 5, 6 and 7 are views similar to Fig. 2, but illustrating further modifications of the seal;

Fig. 8 is a fragmentary sectional view of the lower portion of a submersible structure in which the rotating shaft extends downwardly from the casing;

Figs. 9 and 10 are fragmentary sectional views showing modifications of the structure illustrated in Fig. 8;

Fig. 11 is a sectional view similar to Fig. 2 illustrating a still further modification of the seal; and Fig. 12 is an enlarged fragmentary view of a seal similar to that of Fig. 3, but incorporating precautions against deterioration and corrosion of the sealing members.

The general character of the submersible structure is illustrated to best advantage in Fig. 1. In this figure there is shown a well casing 1. Within the well there is shown the submersible electrical motor 2, which provides at its upper extremity a driving shaft 3 adapted to be connected, for example, to a pump, not shown, for pumping liquid from the well. The electrical motor 2 is shown as submerged within the liquid 4, which in most instances is water.

The electrical motor 2 is most conveniently of the induction motor squirrel cage type, having primary or stator windings 5. These windings are adapted to be connected, as by the aid of cable 6, to a suitable source of electrical power at the top of the well.

Since the liquid 4 carries foreign particles or dirt, the bearings supporting shaft 3 must be guarded against entry of this liquid. Furthermore, the windings of the motor 2 must also be kept separate from this liquid, for otherwise it would quickly disable the motor.

In order to secure these results, a casing structure is provided which is so arranged that the liquid 4 is excluded from the parts that need to be protected, for all conditions of operation, as regards well pressure, level of the liquid, etc. In this instance, this casing structure is shown as formed by a cylindrical body 7 within which the motor stator laminations may be supported. Securely attached to the lower end of the body 7, as by welding, there is an end collar 8. To this in turn is fastened a bearing supporting housing 9. For example, the bearing housing support 9 may be attached to the collar 8 as by a series of threaded studs 10. In this instance the housing 9 provides a stationary collar 11 for supporting the outer race of a ball thrust bearing structure 12. The inner race of this structure 12 is shown as directly supported upon the shaft 3. Upon this shaft 3 are attached the rotor laminations, as is well understood. Since the body 7 may be made from standard pipe, it is a simple matter to provide the correct length of the body required for the rating of the particular motor involved.

At the upper end of the body 7 there is located a collar 13 permanently secured, as by welding, to the top of the body 7. Similarly attached to the collar 13 is an upper bearing housing member 14. The manner of attaching this upper housing member 14 to the collar 13 may be by studs, such as 10, threading into tapped apertures in the top of the collar 13.

The housing 14 provides an axial, inwardly extending boss 15. This boss serves as an appropriate support for the outer race of a radial ball bearing structure 16. The inner race of this ball bearing structure may be directly supported upon the shaft 3.

The shaft 3 extends upwardly through the boss 15 for direct connection to a pump. It is apparent that precautions must be taken to prevent entry of the liquid 4 around the rotating shaft 3 where it extends from the casing structure. The manner in which this is accomplished will be shortly described.

The cable 6 extends through a coupling member 17 in fluid tight connection with the top of the housing 14, leading the connections from the winding 5 upwardly out of the casing structure.

It is preferred to have an inert, lubricating liquid filling within the casing structure. For this purpose lubricating oil is convenient, although other liquids that may be suitable could be used. This liquid filling is indicated by reference character 18 below the thrust bearing structure 12. The casing structure may be replenished with liquid, as required. For example, a supply pipe 19 can be connected to the top of the bearing housing 14, as by the aid of the pipe connection 20. This pipe 19 may lead to the top of the well for appropriate connection to a source of the liquid under suitable pressure.

It is advantageous that the liquid pressure inside of the casing structure be closely controlled. In this way there is an assurance that the sealing means provided for the shaft 3 will not be subjected to an undue pressure differential. In the present instance, equality of pressure is secured by extending the housing 9 downwardly and leaving an opening 21 therein for the ingress of the water. The filling of liquid 18 is such that the surface of contact 22 between it and the water is always considerably below the lower bearing structure 12. Since both the liquid and the water are substantially incompressible, this level 22 is maintained substantially constant, irrespective of the depth to which the submersible motor is lowered.

Should it ever be desired to change the liquid filling while the motor is submerged, it is possible to urge liquid downwardly under pressure through pipe 19. The new liquid coming in will express the old liquid outwardly through the aperture 21, and the casing will be maintained full with the freshly supplied liquid.

The shaft 3, shown most clearly in Fig. 2, passes upwardly through a clearance aperture 24 located in the top flange of the tubular casing extension 23. This tubular extension 23 is joined to the casing structure as by being threaded into the top of the bearing housing structure 14. The water from the well, of course, may enter around the shaft 3 through the clearance aperture 24. However, it is prevented from entering through the boss 15, by the provision of a sealing structure now to be described. This sealing structure involves in general the provision of a pair of annular sealing surfaces arranged to be placed in contact with each other, one of which is non-rotary and supported by the submersible casing, and the other rotary and supported by the shaft 3. This surface seal is enhanced by the aid of a supplemental liquid seal, such as mercury or carbon tetrachloride, thus providing a double sealing effect.

For example, in the form shown in Figs. 1 and 2, the shaft 3 carries a cup 25. This cup is urged against a shoulder 26 on shaft 3, as by the aid of the nut 27 threaded on the shaft 3 and maintaining the cup 25 in liquid tight connection with the shaft 3. The upper edge of cup 25 is shown as being in contact with the lower edge of flange 28 which is formed upon a non-rotary collar 29. This collar 29 is supported by the tubular member 23 in such a way as to permit vertical movement while maintaining the annular surface around shaft 3 separate from the interior of the tubular member 23. For example, this may be accomplished by the aid of a metal bellows 30. This metal bellows is joined in fluid tight manner at its top to the short depending flange 31 extending from the top of the tubular housing 23. The lower end of the metal bellows 30 is similarly permanently secured to the flange 32, shown as integral with the collar 29. A compression spring 33 is in contact at its upper end with the lower surface of the top flange of tubular member 23. The lower end of compression spring 33 rests upon the collar 29 to urge the collar and the flange 28 downwardly against the outer edge of the cup 25.

The liquid 4 from the well may enter into the space within the bellows 30 and into the cup 25. It would, however, be prevented from entry into the casing structure by the annular seal provided between the relatively rotating parts 25 and 28. In some instances this seal might be sufficient; however, in the present instance this sealing effect is enhanced or fortified by the use of a heavy liquid filling 34 within the cup 25 and overlapping the surface of contact between members 25 and 28. Preferably this heavy liquid 34 is of the kind which has a high surface tension, such as mercury. Carbon tetrachloride may also be used.

In Fig. 2 the space between cup 25 and flange 28 may be in communication with an outlet 37 for filling this space with the appropriate heavy liquid as required. This filling aperture may be closed by an appropriate plug as indicated.

The characteristics of the seal shown in Fig. 2 may be summarized as follows: the use of a rotary and non-rotary member having annular sealing surfaces in contact; the use of a "Sylphon" or metal bellows to make it possible to urge one surface against the other while maintaining segregation of liquid from one side to the other of the seal; the use of the pressure inside the chamber containing the inert liquid to create a force holding the sealing surfaces together; and the use of a supplemental heavy liquid overlapping the area of contact to augment and supplement the sealing effect of the relatively rotatable annular surfaces. In the form shown in Fig. 2 the heavy liquid or mercury 34 is shown as disposed within a rotary cup 25. In this way, some centrifugal action is imparted to the liquid 34, causing it to pack rather tightly against the sealing members.

By appropriate choice of areas of the rotary and non-rotary sealing members, which are exposed to the liquid pressures existing within and without the casing, it is possible to cause a preponderance of pressure urging the members together to sealing position; and if desired, this pressure urging the members together may be increased by increasing the pressure within the casing over that existing outside the casing.

The use of the "Sylphon" or flexible member between the stationary member and the contact surface, prevents vibration in this part from being transmitted to the junction of the sealing surface which would tend to break the seal. This flexible member also allows the sealing surfaces to follow inaccuracies in the contacting members and misalignment of the shaft 3 and other inaccuracy tending to open the sealing surface. However, it is possible to use several other modifications as far as the disposal of the liquid seal is concerned.

In Fig. 3 for example, the shaft 38 which extends through a clearance aperture 39 in the top flange of the tubular extension 40, carries a different form of rotary member to provide the sealing effect. In this form the rotary sealing member 41 is shown as having a downwardly directed flange 42 and as being in fluid tight connection with the shaft 38, as by the aid of the nut 43.

There is provided a non-rotary cup 44 having its upper edge in contact with the lower edge of flange 42 to provide the annular sealing surfaces. This cup 44 is provided with an inner annular flange 45 which extends considerably beyond the contacting surfaces. The cup 44 is filled, as before, with a heavy liquid 46, such as mercury. Furthermore, the cup 44 is supported on the top of a metal bellows 47, the bottom of which is fastened to a collar 48. This collar in turn is fastened in liquid tight manner, as by screws 49 to the top surface of the collar formed in boss 15. The compression spring 50 has its lower end supported on a flanged seat 51 disposed over the collar 48. Its upper end urges the cup 44 upwardly to maintain sealing contact between the relatively rotatable members 42 and 44.

In this instance the cup 44 which holds the mercury 46 is non-rotary. The sealing liquid 46 is placed inside of the contacting surfaces and overlaps these contacting surfaces. In Fig. 2 the upper surface of the mercury 34 is in contact with the water of the well; but in form of Fig. 3, this upper surface is in contact with the oil filling of the casing. The water of the well may enter around shaft 38 through clearance hole 39 and will be kept on the outside of the metal bellows 47.

As thus far disclosed in the two modifications, the liquid seal is disposed on the interior of the space bounded by the relatively rotary sealing members. In the form shown in Fig. 4, this arrangement is reversed. The shaft 89 in this instance, extending out of the casing 90, is shown as carrying the rotary sealing member or cup 91. This rotary sealing member 91 has an intermediate flange 92, as well as the outer flange 93. The intermediate flange 92 is contacted by the non-rotary sealing member 94. This non-rotary sealing member 94 is supported on the end of the metal bellows 95. The upper end of this metal bellows is supported on the top flange 96 of the tubular extension 97. Compression spring 98 urges the non-rotary member 94 into contact with the top edge of the intermediate annular flange 92.

The heavy sealing liquid or mercury 99 in this instance is disposed in the annular space exterior of the sealing surfaces and overlapping these sealing surfaces. Thus the upper surface of the liquid 99 is in contact with the oil filling of the casing 90.

In the form of the invention illustrated in Fig. 5, the fluid tight casing 110 is shown as having the tubular extension 111. The shaft 113 extends through the clearance aperture 112 of this extension. Sealing between the inside and the outside of the casing 110 is provided in this instance by the aid of a rotary cup structure 114 carried by the shaft 113 within the extension 11. This rotary cup structure has an outer annular flange 115, as well as an intermediate annular flange 116. The top of this intermediate annular flange 116 is in contact with the lower edge of the non-rotary member 117. This non-rotary member 117 is supported at the bottom of the metal bellows or sylphon 118. The top of the sylphon 118 is fastened to the top flange of the extension 111. Compression spring 119 urges the two contacting surfaces together as before.

In this instance there are two supplemental liquid seals, one within, and one exterior of, the contacting surfaces. Thus the liquid seal 120 is located inside of the annular flange 116 and overlaps the area of contact between the rotary and non-rotary sealing members. The liquid seal 121 is disposed in the annular space between flanges 115 and 116 and likewise overlaps the area of contact. In this form of the invention the surfaces of the liquid seals are in contact respectively with the oil in the casing and the water in the well.

Still another form of the invention is illustrated in Fig. 6. In this form of the invention the casing 122 is provided with an inwardly extending bearing boss 123, as well as with a supplemental hollow extension 124. The shaft 125' extends upwardly through the extension 124. In this instance there are two metal bellows; a lower metal bellows 125 and an upper metal bellows 126. These metal bellows respectively support the rotary sealing members 127 and 128, contacting respectively opposite edges of the non-rotary annular member 129. This annular member 129 is supported as by the aid of its flange 130 upon the top wall of casing 122. The metal bellows 125 and 126 are respectively fastened to the rotary collars 131 and 132 placed below and above the annular member 129. A spacer sleeve 133 between these collars serves to provide an appropriate means for transmitting the thrust of the nut 134 to the lower collar 131 in the process of assembling the apparatus.

The space defined by the members 128 and 129, and bellows 125 and 126 is not directly connected with either the inside or the outside of the submersible structure. However, by the aid of the conduit 135 and a connection 136, a liquid seal, such as mercury 137, is supplied to this space and is kept under a sufficient head of mercury. For example, the conduit 136 may lead to an elevated supply reservoir 138 located slightly above the seal structure. In this way there is always a slight pressure differential within the space in which the mercury seal 137 is located, urging the mercury outwardly against the sealing surfaces.

In the form of the invention illustrated in Fig. 7 the shaft 154 carries the rotary sealing member 155, as by the aid of the metallic bellows 156 and the collar 157. The rotary sealing member 155 is in contact with the inner edge of a non-rotary cup 158 supported on a shoulder 140 of casing 141. Compression spring 159 urges the two sealing surfaces together. The liquid seal 160 is disposed within the cup 158 and exterior of the contacting surfaces. The surface of the liquid seal 160 is in contact with the water of the well.

It is not essential, in order to utilize the seals corresponding to this invention in a casing, that the shaft extend upwardly out of the casing. In the forms of the invention illustrated in Figs. 8, 9 and 10 the shafts are shown as extending downwardly from the fluid tight casing.

Thus in the form of Fig. 8 the motor 2 is shown as having a shaft 161 extending downwardly through the bottom flange 162 of the bearing housing member 163. A downwardly extending tubular extension 164 is provided surrounding the shaft 161. Supported on the shoulder 165 surrounding shaft 161, is an annular non-rotary sealing member 166. It is held in place by the upper end surface of the threaded end of tubular extension 164.

Contacting the lower edge of the non-rotary member 166 is the upper edge of a rotary cup member 167. This cup member is supported by the metal bellows 168, the lower end of which is supported on the collar 169 fastened to a shaft 161. Compression spring 170 urges the two sealing members 166 and 167 together.

In this case also a heavy liquid seal 171, such as mercury, overlaps the areas of contact between the sealing members. It is disposed inside of the cup 167 and fills the intervening space between the metallic bellows 168 and the shaft 161.

In order to make it possible to replenish the liquid seal 171, a feeding tube 172 is shown as supported in the wall of the housing 163 and leading downwardly into the space formed between the stationary member 166 and the shaft 161. This tube may be closed fluid tight, as by the aid of a taper threaded plug 173.

In the form of the invention illustrated in Fig. 9, the casing 174 is shown as having a tubular extension 175 fastened to the bottom thereof. Through this extension extends the shaft 176. This shaft 176 passes through the clearance aperture 177 formed in the bottom of member 175. An inner annular flange 178 forms a non-rotary cup. The upper edge of this inner flange 178 is intended to be in sealing contact with the rotary sealing member 179 carried on a sylphon or metal bellows 180, fastened at its upper end to the rotary collar 181 attached to shaft 176. In the present instance the collar 181 is shown as urged against the shoulder 182 on shaft 176, as by the aid of a sleeve 183 urged upwardly, as by the nuts 184 threaded to the shaft 176. In this instance a liquid seal 185 is disposed around the inner annular flange 178 and extends upwardly to overlap the area of contact between the rotary and non-rotary sealing members. In order to provide means for replenishing the liquid seal, a filling aperture 186 may be provided adapted to be closed liquid tight, as by a threaded plug 187. In this instance it is apparent that the surface of the liquid seal 185 is in contact with the interior filling of the casing 174.

In the form of the invention illustrated in Fig. 10, the casing 174 is provided with a depending annular non-rotary sealing member 192. The bottom edge thereof is adapted to be in sealing contact with the rotary cup member 193. This cup member is urged upwardly, as by a compression spring 194, resting upon the top surface of a collar 195 attached to the shaft 196. This shaft extends downwardly out of the casing 174. Of course, as before, a metal bellows 197 is provided to isolate the spaces on opposite sides of the seal. In this case, a rotary cup member 198 is also supported on the shaft 196 and surrounds the sealing members 192 and 193. A sealing liquid 199 is placed within the cup member 198 and extends on the outside of the sealing surfaces and overlaps them. The surface of sealing liquid 199 is in contact with the liquid in the well.

It may often be desirable to pass a lubricant directly to the contacting surfaces. This may conveniently be done by placing the lubricant liquid filling the casing in communication, through restricted openings, with the sealing surfaces.

The restricted openings may be formed by the aid of porous material forming one of the two sealing members, or by the aid of capillary apertures.

One such form of the invention is illustrated in Fig. 11. In this form of the invention, the casing 255 is shown as having a shaft 256 extending upwardly therefrom. The casing 255 has an upright tubular extension 257. To this tubular extension is fastened the non-rotary annular sealing member 258. The lower surface of this member 258 is contacted by the rotary sealing member 259. This rotary sealing member may be carried by the metal bellows 260 fastened to the rotary collar 261, which in turn is attached to the shaft 256. The compression spring 262 urges the two sealing members together.

Capillary ports 263 are indicated extending from the surface contact through the rotary member 259 to the interior of the casing 255. These passageways carry the lubricating material, such as oil, to the sliding surfaces between the sealing members. In this form of the invention it is preferable to utilize for the rotary seal 259, such material as graphite bronze or impregnated wood.

The character of the contacting surfaces in connection with all of the seals illustrated in these various modifications may be given some consideration. In some instances one of the two relatively rotary members may be made from a metal which forms a mercury amalgam, such as copper. The liquid seal being in the form of a body of mercury, reacts with the metal and forms an amalgam that acts somewhat as an oil film. The effect of providing the amalgam at the contacting surfaces is to smooth out any inequalities thereof.

Also in some instances the character of the materials in contact between the rotary and non-rotary sealing members may be purposely chosen for durability and smoothness, and capability of retaining the required high degree of smoothness for extended periods of operation. As examples of the character of these contacting surfaces, may be mentioned bronze or steel, hardened as by carburizing. The steel may be hardened, in addition, as by nitriding it. Another form of seal may be formed by nitrided steel on nitrided steel. These nitrided steels have extreme hardness and withstand wear remarkably well.

As a substitute for the nitrided steel, chromium plated surfaces may be used for one of the sealing surfaces. The other sealing surface may also be chromium plated steel, or bronze, or even nitrided steel. The important feature is that at least one of the two surfaces is provided with a comparatively hard wearing layer formed as by nitriding, hardening, carburizing or plating. The character of these surfaces discussed applies to all of the forms of the invention illustrated in the drawings.

From a consideration of the description of the various forms of the invention, it is seen that they include the contact of liquid with relatively rotating parts. The liquid may be mercury, oil, water, carbon tetrachloride, or their equivalents. It has been found that the liquids in contact may tend to emulsify and to affect the seal deleteriously. Also, such liquids as mercury tend to combine chemically with the relatively rotating sealing surfaces. For example, bronze or steel rotating in mercury may combine to form a black powder.

In order to obviate these occurrences, the various surfaces in contact with the liquids utilized in the seal may be protected as by a ceramic enamel, or by baked enamel. The enamel reduces the frictional loss, emulsion is retarded, and since the enamel is inert, chemical action is prevented.

Such a construction may be applied to all of the forms heretofore described. In Fig. 12 the seal is of the same character as illustrated in Fig. 3; that is, there is a rotary member 41 mounted on shaft 38 having a sealing surface in contact with the non-rotary mercury cup member 44. Those areas of members 41 and 44 which are exposed to the mercury 46, the oil in the casing and the water of the well, are overlaid with a layer of inert material, such as baked enamel, or ceramic enamel, indicated at 269, 270. The layers 269 and 270 are at least in partial contact with the mercury 46 and are also in contact with the liquid in the casing.

Such layers are also indicated specifically in Figs 2, 4 and 6. In Fig. 2, the layers 325, 326 thus are intended to overlap the region of contact between the liquids. Similar layers 319, 320 are shown in Fig. 4, while in Fig. 6 sleeve 133 may be covered thus.

What is claimed is:

1. In a submersible structure, a casing, a rotary shaft extending from the casing, a cup carried by the shaft, a non-rotary member having an annular surface contacting with the edge of the cup, and carried by the casing, a metal bellows carried by the casing and supporting said non-rotary member, means urging said cup and member together, and a liquid seal within the cup overlapping the region of contact.

2. In a submersible structure, a casing, a rotary shaft extending from the casing, an annular rotary cup, having means forming an inner edge carried by the shaft, a metal bellows supported by the casing and surrounding the shaft, a non-rotary member supported by the bellows and having a surface contacting the inner edge of the annular cup, and a liquid seal in the cup and overlapping the contacting areas.

3. In a submersible structure, a casing, a rotary shaft extending from the casing, a rotary annular cup carried by the shaft and having an external annular edge, as well as another annular edge intermediate the external edge and the shaft, a non-rotary member carried by the casing and having an annular surface in contact with said intermediate edge, and liquid seals respectively on the inside and outside of said annular edge and overlapping the area of contact.

4. In a submersible structure, a casing, a rotary shaft extending from the casing, an annular cup supported on the shaft for rotation therewith, a non-rotary member supported on the casing and extending into the cup, a rotary member supported on the shaft having an annular surface of contact with the non-rotary member within the cup, a metal bellows interposed between one of said members and its support, and a liquid seal in the cup overlapping the area of contact.

5. In a submersible structure, a casing, a rotary shaft extending from the casing, a non-rotary member having an annular surface of contact surrounding the shaft, a rotary member having an annular surface engaging said surface of contact, means resiliently urging said surfaces together, and a liquid seal overlapping said surfaces and isolating them from the well liquid, said liquid seal having a surface in free contact with the well liquid.

6. In a submersible structure, a casing, a rotary shaft extending from the casing, a non-rotary member, a rotary member, one of said members having a pair of spaced walls forming a cup of ring-like cross section surrounding the shaft, one of said walls having an annular surface of contact, the other wall extending beyond said surface, the other member having a surface engaging said annular surface, means resiliently urging said members to bring said surfaces together in sealing relation, and a liquid seal in the space between said walls overlapping said surfaces, and out of contact with the shaft.

7. In a submersible structure, a casing, a rotary shaft extending from the casing, an annular cup, a non-rotary member supported on the casing and extending into the cup, a rotary member supported on the shaft having an annular surface of contact with the non-rotary member, said surface of contact being within said cup, a metal bellows interposed between one of said members and its support, and a liquid seal in the cup overlapping the area of contact.

8. In a submersible structure, a casing, a rotary shaft extending from the casing, a non-rotary member having an annular surface of contact surrounding the shaft, a rotary member on said shaft having an annular surface engaging said surface of contact, means resiliently urging said surfaces together, means forming a liquid seal overlapping said surfaces, and a cylindrical housing enclosed said members and freely admitting well liquid to contact the surface of the liquid seal.

9. In a submersible structure, a casing, a rotary shaft extending vertically from the casing, means forming a cup supported substantially co-axially with the shaft and having a wall spaced radially from the shaft defining with the shaft an annular space about the shaft, means forming a member also having a wall spaced radially from the shaft and defining with the shaft an annular space about the shaft, said wall having an annular surface contacting the edge of the wall of the cup, said cup forming means and said members forming means being supported respectively on said shaft and on the casing, a metal bellows interposed between one of said means and its support, means urging said cup forming means and said member forming means toward each other to bring the contacting surfaces into sealing relation, and a liquid seal in said annular space overlapping the entire circumference of the region of contact.

THOMAS G. MYERS.